United States Patent [19]

Hirsch et al.

[11] Patent Number: 4,806,158
[45] Date of Patent: Feb. 21, 1989

[54] PROCESS OF REDUCING FINE-GRAINED IRON-CONTAINING MATERIAL BY MEANS OF SOLID CARBONACEOUS REDUCING AGENTS

[75] Inventors: Martin Hirsch, Friedrichsdorf; Fritz Rose, Bad Homburg; Harry Serbent, Hanau am Main, all of Fed. Rep. of Germany

[73] Assignee: Metallgesellschaft Aktiengesellschaft, Frankfurt am Main, Fed. Rep. of Germany

[21] Appl. No.: 80,303

[22] Filed: Jul. 31, 1987

[30] Foreign Application Priority Data

Aug. 1, 1986 [DE] Fed. Rep. of Germany ....... 3626027

[51] Int. Cl.$^4$ ............................................. C21B 13/14
[52] U.S. Cl. ........................................................ 75/26
[58] Field of Search ............................................ 75/26

[56] References Cited

U.S. PATENT DOCUMENTS

| | | | |
|---|---|---|---|
| 2,742,354 | 4/1956 | Ogorzaly et al. | 75/26 |
| 4,578,110 | 3/1986 | Price-Falcon et al. | 75/34 |
| 4,678,508 | 7/1987 | Saeki et al. | 75/26 |

FOREIGN PATENT DOCUMENTS 2253228 5/1973 Fed. Rep. of Germany.
2655813 6/1978 Fed. Rep. of Germany.
3145507 5/1983 Fed. Rep. of Germany.

Primary Examiner—Melvyn J. Andrews
Attorney, Agent, or Firm—Felfe & Lynch

[57] ABSTRACT

Disclosed is a process for the production of reduced iron oxide-containing materials. Iron oxide and solid carbonaceous reducing agent are charged into a first expanded fluidized bed, which is supplied with an oxygen-containing fluidizing gas. The gas residence time selected is controlled in the reactor containing the first fluidized bed so that the reduction potential will result in a reduction of the iron oxide material not in excess of the FeO stage. A gas-solids suspension discharged from the first fluidized bed is supplied to a second expanded fluidized bed, which is supplied with a strongly reducing fluidizing gas. Strongly reducing gas and a major portion of the resulting devolatilized carbonaceous material are discharged from the upper portion of the second fluidized bed. Reduced material having a metallization of 50 to 80% and the remaining devolatilized carbonaceous material are discharged from the lower portion of the second fluidized bed.

16 Claims, 1 Drawing Sheet

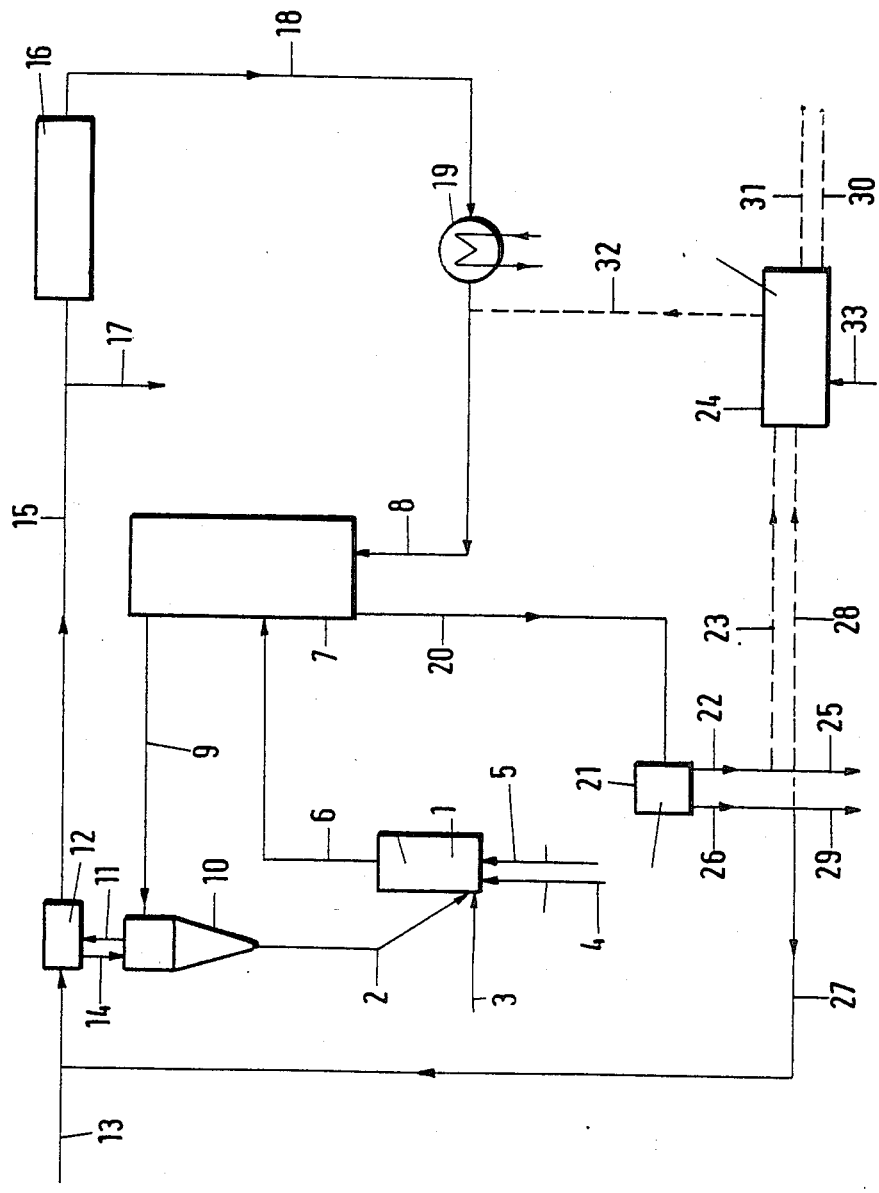

PROCESS OF REDUCING FINE-GRAINED IRON-CONTAINING MATERIAL BY MEANS OF SOLID CARBONACEOUS REDUCING AGENTS

BACKGROUND OF THE INVENTION

The present invention is in a process for the direct reduction of iron oxide-containing materials in a plurality of series-connected fluidized beds by means of solid carbonaceous reducing agents, wherein weakly reducing conditions are maintained in the first fluidized bed and strongly reducing conditions are maintained in the second fluidized bed.

In the mining of ores and in the processing or relatively poor iron ores, fine-grained ores become available in increasing quantities. Then fine-grained ores can be directly reduced below their melting temperature by particularly fluidized bed processes because these processes provide for highly favorable conditions for a transfer of matter and heat. In the direct reduction by means of solid carbonaceous reducing agents, the following different steps must be performed in succession: heating the ore and coal, devolatilizing the coal, gasifying the coal, reducing the ore and possibly cooling the end product.

German Patent Publication No. 22 53 228 discloses a process in which fine coal is used as a reducing agent for a direct reduction resulting in a metallization of 60 to 80%. The reduction is effected in two connected orthodox fluidized beds in series. The fluidized beds are only slightly enlarged or expanded and have a defined bed surface. Ore and coal are charged into the first fluidized bed and are fluidized with preheated air so that a gas having a small reduction potential is produced. This results in a reduction of the iron oxide content mainly to the FeO stage. The weakly reducing exhaust gas from the first fluidized bed is supplied to a steam generator and the pre-reduced material is introduced into a second fluidized bed. The second fluidized bed is also supplied with preheated air as a fluidizing gas. A strong reducing gas is produced in the second fluidized bed so that the desired metallization is effected.

The reduced product flows into a smelting reactor, which is supplied with the required heat substantially in the form of electrical energy. The strong reducing exhaust gas is also supplied to the steam generator. In that process, hot spots formed in the second fluidized bed result in temporary molten phases, which tend to form crusts on the air inlet nozzles so that the uniform progress of the operation is severely disturbed.

Published German Application No. 25 10 116 discloses a process in which a direct reduction is effected in a circulating fluidized bed by means of solid carbonaceous material. The fluidized bed reactor comprises two stages, which are arranged one over the other and are not separated from each other. Ore and coal are charged into the intermediate portion of the reactor and oxygen-containing gas in also injected into said intermediate part. The required heat is generated by a partial combustion of the carbonaceous material in the upper portion of the reactor so that the carbonaceous material is coked and devolatilized and iron oxide is reduced to a certain degree at 850° to 1000° C. A suspension of solids and gas is withdrawn from the upper portion. The solids are separated from the suspension and recycled to the intermediate portion of the reactor. After $CO_2$ and water vapor have been removed from the gas, the latter is supplied as a fluidizing and reducing gas into the lower portion of the reactor. Reduced material and coke are withdrawn from said lower portion. The problems mentioned above arise also in the last-mentioned process.

It is an object of the invention to ensure in the direct reduction by means of solid carbonaceous reducing agents in a fluidized bed that a formation of hot spots and crusts, particularly at the nozzles used to supply oxygen-containing gases, will be avoided and a satisfactory sequence of operations will be effected.

SUMMARY OF THE INVENTION

That object and others are obtained in accordance with the process of the invention. Iron oxide-containing material and solid carbonaceous reducing agent are charged into a first expanded fluidized be. An oxygen-containing gas is introduced as a fluidizing gas into the first fluidized bed. The residence time selected for the gas in the first fluidized bed is limited so that the reduction potential will result in a reduction not in excess of the FeO state. The gas-solids suspension discharged from the first fluidized bed is supplied to a second expanded fluidized bed and a strongly reducing gas is supplied as a fluidizing gas into the second fluidized bed. The strongly reducing gas and a major portion of the resulting devolatilized carbonaceous material are discharged from the upper portion of the second fluidized bed. The devolatilized carbonaceous material is separated from the gas and recycled to the first fluidized bed. A portion of the gas from the second fluidized bed is purified, treated to remove $CO_2$, and is then recycled to the second fluidized bed as fluidizing gas. Reduced material that has been subjected to a metallization of 50 to 80% and the remainder of the devolatilized carbonaceous material are discharged from the lower portion of the second fluidized bed. Metallization refers to the percentage of metallic iron based on the iron content of the feed material.

The rate at which devolatilized carbonaceous material is recycled from the upper portion of the second fluidized bed to the first fluidized bed is a multiple of the rate at which iron oxide-containing materials are charged to the first fluidized bed. The heat content of the suspension that is supplied from the first fluidized bed to the second fluidized bed is used to supply the heat demand of the second fluidized bed.

The term "expanded fluidized bed" is used to describe highly expanded fluidized beds which are operated above the lowest velocity at which the solid particles are maintained in suspension (terminal velocity of a falling particle). Whereas in an "orthodox" fluidized bed, a dense phase is separated by a distinct density step from the overlying gas space, expanded fluidized beds distinguish by states of distribution having no defined boundary layer. There is no density step between a dense phase and an overlying gas space although the solids concentration in the reactor decreases continuously in an upward direction. A gas-solids suspension is withdrawn from the upper portion of the reactor. A definition of the operating conditions by the Froude and Archimedes number indicates the following ranges:

$$0.1 \leq \frac{3}{4} \cdot Fr^2 \cdot \frac{\rho_g}{\rho_k - \rho_g} \leq 10$$

wherein $$0.01 \leq Ar_3 \leq 100$$

$$Ar = \frac{d_k^3 \cdot g(\rho_k - \rho_g)}{\rho_g \cdot \nu^2}$$

$$Fr^2 = \frac{u^2}{g \cdot d_k}$$

u=relative velocity of gas in m/s
Ar=Archimedes number
Fr=Froude number
$\rho g$=density of gas in kg/m$^3$
$\rho k$=density of solid particle in kg/m$^3$
$d_k$=diameter of spherical particle in m
$\nu$=kinematic viscosity in m$^2$/s.
g=constant of gravitation in m/s$^2$.

Suitable carbonaceous materials include all coals, from anthracite to lignite, carbonaceous minerals and waste products, such as oil shale, petroleum coke or washery refuse, provided that they are solid at room temperature. The oxygen-containing gas preferably consists of oxygen or of oxygen-enriched air.

The residence time of the gas in the reactor containing the first fluidized bed is in the range from approximately 0.5 to 3 seconds and is controlled by the selection of the height of the reactor. Within the limits stated above, the residence time may be controlled by an adjustment of the gas velocity.

The residence time of the iron oxide containing material in the reactor containing the first fluidized bed is from about 0.2 minutes to 1.5 minutes. The mean solids density in the reactor containing the first fluidized bed amounts to 100 to 300 kg/m$^3$ related to the empty space in the furnace.

The second fluidized bed is not supplied with a gas which contains free oxygen. In the reactor containing the second fluidized bed, the residence time of the gas amounts of more than 3 seconds and the residence time of the iron oxide containing material amounts to about 15 to 40 minutes. For this reason the second reactor is higher than the first. The mean solids density in the lower portion of the reactor containing the second fluidized bed, i.e., in that portion which is disposed below the inlet for the gas-solids suspension from the first fluidized bed, amounts to 300 to 600 kg/m$^3$, related to the empty space in the furnace. In the upper portion of the second reactor the mean solids density is from 50 to 200 kg/m$^3$. The inlet for delivering the gas-solids suspension to the second fluidized bed is disposed at least one meter (1 m) above the inlet for the strongly reducing fluidizing gas and may be disposed within the lower 30% of the height of the furnace.

Surprisingly it has been found that an effective separation of devolatilized carbonaceous material and reduced iron-containing material can be effected in the second fluidized bed if it is operated under the conditions stated. That result is contrary to the opinion which is generally held in the art.

The heat required in the second reactor is supplied by the gas-solids suspension from the first reactor and a major part of the heat is supplied as the heat content of the devolatilized carbonaceous material, which serves as a heat transfer medium. For that purpose the reactor containing the first fluidized bed is operated at a temperature which exceeds the outlet temperature of the reactor containing the second fluidized bed. The overheating which is to be effected for that purpose in the reactor containing the first fluidized bed will depend on the rate at which the devolatilized carbonaceous material is recycled from the upper portion of the reactor containing the second fluidized bed. In dependence on the reactivity of the carbonaceous material the temperatures in the fluidized beds lie in the range from 850° to 1100° C. The reduced material is withdrawn together with a certain quantity of devolatilized carbonaceous material from the lower portion of the second fluidized bed.

The fluidized beds may be operated under an only slightly superatmospheric pressure or under a pressure of up to about 20 bars above atmospheric pressure. A portion of the exhaust gas from the second fluidized bed is used for a different purpose, e.g., as a fuel gas in a steam generator for electric power production. The reduced product may be subjected to further processing in a hot state or after it has been cooled. Before such further processing the carbonaceous material may be separated, e.g., by magnetic separation.

In a preferred embodiment, the temperature of the suspension entering the second fluidized bed exceeds by 30° to 80° C. the temperature of the strongly reducing gas and the devolatilized carbonaceous material which are withdrawn from the upper portion of the second fluidized bed. The rate at which the devolatilized carbonaceous material is recycled from the upper portion of the second fluidized bed to the first fluidized bed is 10 to 50 times the rate at which iron oxide-containing material is charged to the first fluidized bed.

If the suspension is overheated in the first fluidized bed to a temperature in the upper portion of the stated temperature range, the rate at which solids are recycled from the upper portion of the second fluidized bed to the first fluidized bed should be in the lower portion of the stated range and vice versa.

In an optimum mode of operation the overheating is effected to the highest permissible temperature at which a sintering or incrustation does not yet occur and the rate at which the material is recycled is kept correspondingly low. If the material is recycled at a rate which is less than ten times the feed rate of the iron oxide-containing material, the temperature differences will be excessively high and may result in temperatures in excess of the melting points of the iron oxide-containing material and of the ash of the carbonaceous material. On the other hand, recycling at a rate which is more than 50 times the feed rate of the iron oxide containing material will result in a high pressure loss and, as a result, in higher solids concentrations, which will hinder the desired separation in the second fluidized bed.

In a preferred embodiment, the devolatilized carbonaceous material is separated from the material which is discharged from the lower portion of the second fluidized bed and at least a portion of the thus separated carbonaceous material is recycled to the first fluidized bed. In that case the devolatilized carbonaceous material will be recycled to the process and a pure reduced product will be obtained. If the reduced product is supplied to a final reduction step, the carbon required for that purpose can be supplied at an exactly proportioned rate. This will also be the case if the reduced product is melted.

In a preferred embodiment the iron oxide-containing material is preheated by the strongly reducing gas from the second fluidized bed before the iron oxide-containing material is charged to the first fluidized bed. In that case, part of the sensible heat of the exhaust gas will be utilized in a particularly favorable manner.

In accordance with a further preferred feature, the reduced material is completely reduced and smelted in at least one smelting reactor and the exhaust gas from the smelting reactor is supplied as a strongly reducing gas to the second fluidized bed. In that case the gases formed during the final reducing step and the smelting steps can be utilized in the process. Alternatively, the exhaust gas from the smelting reactor can be used as a strongly reducing gas for other puproses.

In accordance with a further preferred feature, a portion of the devolatilized carbonaceous material which has been separated from the lower portion of the second fluidized bed is charged into the smelting reactor. The separated carbonaceous material is charged to the smelting reactor at such a rate that its carbon content is sufficient for the final reduction and, if desired, for a carbonization and in case of a processing in a converter will be sufficient for the generation of the required heat. In that case the molten material is not supplied from the coal with volatile constituents, which would extract energy from the molten material.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWING

The drawing schematically depicts the process of the invention.

DESCRIPTION OF PREFERRED EMBODIMENT

Referring to the drawing, a first fluidized bed 1 is supplied with preheated ore through line 2 and with coal through line 3. The ore can contain $Fe_2O_3$ or $Fe_3O_4$ or mixtures thereof. Oxygen and air are introduced into the reactor through lines 4 and 5 respectively. The gas-solids suspension resulting in the first fluidized bed 1 is transferred therefrom through line 6 into the second fluidized bed 7. The second fluidized bed is supplied with a strongly reducing, oxygen-free gas through line 8. The strongly reducing gas, which contains a large part of devolatilized carbonaceous material, is withdrawn from the second fluidized bed through line 9 and supplied to a cyclone separator 10. After a removal of substantially all solids, the gas from the cyclone separator 10 is introduced through line 11 into a preheater 12. The solids separated from the gas in the cyclone separator 10 are supplied through line 2 to the fluidized bed 1. Fresh ore and any admixtures are supplied through line 13 to the preheater 12 and then through line 14 into the cyclone separator 10 and further through line 2 to the fluidized bed 1.

Gas from the preheater 12 is supplied through line 15 to a gas-processing plant 16, in which the gas is subjected to dust collection and cooling and to a removal of substantially all $CO_2$ and $H_2O$. A partial stream of the gas is withdrawn from the circulating system through line 17. The purified gas is compressed by means not shown and is then supplied in line 18 to a gas heater 19 and from the latter through line 8 to the fluidized bed 7.

Reduced ore and part of the devolatilized coal are withdrawn from the fluidized bed 7 in line 20 and are supplied to a product-processing plant 21, wherein the solids are cooled, subjected to magnetic separation, and the reduced ore is withdrawn in line 22. The reduced ore may be supplied in line 23 to a smelting reactor 24 or may be discharged as a product in line 25.

Devolatilized carbonaceous material is withdrawn in line 26 and may be supplied in line 27 to the preheater 12 and in line 28 to the smelting reactor 24 or may be withdrawn from the process in line 29.

From the smelting reactor 24, liquid hot metal is withdrawn in line 30 and slag is withdrawn in line 31. The exhaust gas from the smelting reactor 24 is conducted in line 32 to line 8 after an optional purification. The smelting reactor 24 may consist of an electric reducing furnace or of a converter, into which oxygen is blown from line 33.

The Examples are described in tabular form wherein the flow streams are identified as in the Figure (Ref.-num.). The reactor containing the first fluidized bed has an inside diameter of 0.06 m and a height of 6 meters. The reactor containing the second fluidized bed has an inside diameter of 0.08 meters and a height of 20 meters.

| Ref. Num. | Rates (per hour) | |
|---|---|---|
| | Example 1 | Example 2 |
| 2 | 900° C. | 900° C. |
| | 303.2 kg solids | 394.7 kg solids |
| 3 | 25° C. | 25° C. |
| | 9.3 kg coal | 7.2 kg coal |
| | 58% fixed carbon*) | 70% fixed carbon*) |
| | 42% volatiles*) | 30% volatiles*) |
| | 35% ash | 18% ash |
| | 10% moisture | 6% moisture |
| 4 | 60° C. | 60° C. |
| | 3.5 kg oxygen | 3.5 kg oxygen |
| 5 | 60° C. | |
| | 2,4 kg air | |
| 6 | 944° C. | 931° C. |
| | 307.1 kg solids | 397.7 kg solids |
| | degree of reduction about 32% | degree of reduction about 32% |
| | 11.0 kg gas | 8.1 kg gas |
| | 21.2% $CO_2$ | 25.6% $CO_2$ |
| | 21.2% CO | 25.6% CO |
| | 17.3% $H_2$ | 19.4% $H_2$ |
| | 22.9% $H_2O$ | 25.5% $H_2O$ |
| | 17.4% $N_2$ | 3.9% $N_2$ |
| 8 | 500° C. | 400° C. |
| | 5,3 kg gas | 15.7 kg gas |
| 9 | 900° C. | 900° C. |
| | 292.2 kg solids | 385.2 kg solids |
| | 19.4 kg gas | 26.1 kg gas |
| | 15.8% $CO_2$ | 18.5% $CO_2$ |
| | 39.1% CO | 46.0% CO |
| | 20.4% $H_2$ | 20.3% $H_2$ |
| | 10.9% $H_2O$ | 10.7% $H_2O$ |
| | 13.8% $N_2$ | 4.5% $N_2$ |
| 13 | 25° C. | 25° C. |
| | 10 kg ore | 10 kg ore |
| | 97.5% $Fe_2O_3$ | 87.4% $Fe_2O_3$ |
| | 1,0% moisture | 5.0% moisture |
| | balance gangue | balance gangue |
| 14 | 623° C. | 680° C. |
| | 11 kg solids | 9.5 kg solids |
| | 623° C. | 680° C. |
| | 0.1 kg solids | 0.1 kg solids |
| | 19.5 kg gas | 26.6 kg gas |
| 17 | 13.6 kg gas | 12.0 kg gas |
| 18 | 93° C. | 93° C. |
| | 4.5 kg gas | 10.5 kg gas |
| | 5.0% $CO_2$ | 5.0% $CO_2$ |
| | 45.4% CO | 55.2% CO |

-continued

| Ref. Num. | Rates (per hour) | |
|---|---|---|
| | Example 1 | Example 2 |
| | 23.6% $H_2$ | 24.3% $H_2$ |
| | 10.1% $H_2O$ | 10.1% $H_2O$ |
| | 15.9% $N_2$ | 5.4% $N_2$ |
| 20 | 900° C. | 900° C. |
| | 11.8 kg solids | 10.2 kg solids |
| 23 | 200° C. | 200° C. |
| | 10.3 kg sponge iron | 8.4% sponge iron |
| | metallization 80% | metallization 80% |
| 24 | electric reducing furnace | converter |
| 27 | 1.0 kg char | — |
| 28 | 0.4 kg char | 1.8 kg char |
| 30 | 1550° C. | 1550° C. |
| | 7.2 kg hot metal | 6.3 kg hot metal |
| | 1% C | 1% C |
| 31 | 1550° C. | 1550° C. |
| | 2.8 kg slag | 1.8 kg slag |
| 32 | 1550° C. | 1550° C. |
| | 0.7 kg gas | 5.0 kg gas |
| 33 | — | 2.8 kg oxygen |

*water- and ash-free

The advantages afforded by the invention reside in that the reduction can be effected in the fluidized beds without a disturbance. Virtually no metallic iron is contained in the first fluidized bed, which is supplied with oxygen-containing gases for generating the required heat. As a result, no reoxidation of metallic iron and no hot spots at the nozzles will occur in the first fluidized bed. Such occurrences are also avoided in the second fluidized bed because it is not supplied with oxygen-containing gases. A recycling of metallic iron from the second fluidized bed to the first fluidized bed is also avoided.

It will be understood that the specification and examples are illustrative but not limitative of the present invention and that other embodiments within the spirit and scope of the invention will suggest themselves to those skilled in the art.

We claim:

1. A process for the direct reduction of iron oxide-containing materials, comprising:
   introducing an iron oxide-containing material and a solid carbonaceous reducing agent into a first expanded fluidized bed;
   introducing an oxygen containing gas into said first expanded fluidized bed as fluidizing gas;
   maintaining weakly reducing conditions in said first expanded fluidized bed and adjusting the gas residence time therein so that reduction potential will result as a reduction of the iron oxide-containing material not in excess of the FeO state;
   discharging a gas-solids suspension from the first expanded fluidized bed;
   introducing the gas-solids suspension into a second expanded fluidized bed;
   supplying a strongly reducing gas as fluidizing gas into said second expanded fluidized bed;
   discharging at least a portion of the devolatilized material with the strongly reducing gas from an upper section of the second expanded fluidized bed;
   and discharging the reduced material from the lower portion of the second expanded fluidized bed.

2. The process of claim 1 wherein the reduced material has a metallization of 50 to 80%.

3. The process of claim 1 wherein a major portion of the devolatilized carbonaceous material is discharged from the upper section of the second expanded fluidized bed.

4. The process of claim 3 wherein at least a portion of the devolatilized carbonaceous material is separated from the gas and is recycled to the first fluidized bed.

5. The process of claim 4 wherein the gas contains $CO_2$ and at least a portion of the gas is purified and treated to remove $CO_2$.

6. The process of claim 5 wherein the purified and treated gas is recycled to the second expanded fluidized bed as fluidizing gas.

7. The process of claim 1 wherein a portion of the devolatilized carbonaceous material is discharged from a lower section of the second expanded fluidized bed.

8. The process of claim 4 wherein the rate of recycle of the separated discharged carbonaceous material is a multiple of the feed rate of the iron oxide-containing material to the first expanded fluidized bed.

9. The process of claim 1 wherein the gas-solids suspension of the first expanded fluidized bed has a heat content which supplies the heat demand in the second expanded fluidized bed.

10. The process of claim 1 wherein the temperature of the suspension entering, the second fluidized bed exceeds by 30° to 80° C. the temperature of the strongly reducing gas.

11. The process of claim 8 wherein the multiple is 10 to 50 times.

12. The process of claim 7 wherein the devolatilized carbonaceous material is separated from the material which is discharged from the lower portion of the second expanded fluidized bed and at least part of the thus separated carbonaceous material is recycled to the first expanded fluidized bed.

13. The process of claim 1 wherein the iron oxide-containing material is preheated by the strongly reducing gas from the second expanded fluidized bed before the iron oxide-containing material is charged to the first expanded fluidized bed.

14. The process of claim 1 wherein the reduced material is completely reduced and smelted in at least one smelting reactor.

15. The process of claim 14 wherein the smelting reactor provides an exhaust gas which is used as the strongly reducing gas in the second expanded fluidized bed.

16. The process of claim 7 wherein a portion of the devolatilized material which has been separated from the material withdrawn from the lower portion of the second expanded fluidized bed is charged to the smelting reactor.

* * * * *